(12) United States Patent
Lee et al.

(10) Patent No.: US 8,793,276 B2
(45) Date of Patent: Jul. 29, 2014

(54) CLIENT-SIDE STATEMENT ROUTING IN DISTRIBUTED DATABASE

(75) Inventors: Juchang Lee, Seoul (KR); Jaeyun Noh, Seoul (KR); Chulwon Lee, Seoul (KR); Michael Muehle, Walldorf (DE); Alexander Schroeder, Berlin (DE); Marco Paskamp, Hansestadt Stendal (DE); Sang Kyun Cha, Seoul (KR)

(73) Assignee: SAP AG, Walldorf (DE)

( * ) Notice: Subject to any disclaimer, the term of this patent is extended or adjusted under 35 U.S.C. 154(b) by 83 days.

(21) Appl. No.: 13/449,044

(22) Filed: Apr. 17, 2012

(65) Prior Publication Data
US 2013/0275467 A1 Oct. 17, 2013

(51) Int. Cl.
*G06F 17/30* (2006.01)
(52) U.S. Cl.
USPC ................................................ 707/770
(58) Field of Classification Search
CPC ................................................ G06F 17/30132
USPC ................ 707/2, 3, 634, 770; 717/140; 709/204–206
See application file for complete search history.

(56) References Cited

U.S. PATENT DOCUMENTS

| 7,720,813 B2 * | 5/2010 | Ellsworth et al. ............. 707/634 |
| 8,365,153 B2 * | 1/2013 | Chen et al. ..................... 717/140 |
| 2006/0074937 A1 | 4/2006 | Bird et al. | |
| 2007/0136311 A1 | 6/2007 | Kasten et al. | |

OTHER PUBLICATIONS

Anonymous, "Why Prepared Statements are important and how to use them "properly"", Dec. 15, 2010, XP055115129, retrieved on Apr. 24, 2014, retrieved from the Internet: URL:http://wayback.archieve.org/web/20101215013258/http://www.theserverside.com/news/1365244/Why-Prepared-Statement-are-important-and-how-to-use-them-properly, 5 pgs.
Kossmann, Donald "The State of the Art in Distributed Query Processing", ACM Computing Surveys, vol. 32, No. 4, Dec. 1, 2000, XP002952901, ISSN: 0360-0300, DOI: 10.1145-371578.371598, (pp. 422-469, 48 pages total).
Anonymous, "JDBC: When Good Prepared Statements go Bad— Bob Duffy's Blobby Blog—Site Home—MSDN Blogs", Jun. 28, 2010, XP055115295, retrieved on Apr. 25, 2014, retrieved from the Internet:URL:http://wayback.archive.org/web/20100628045103/http://blogs.msdn.com/b/boduff/archive/2007/11/11/jdbc-whne-good-prepared-statements-go-bad.aspx, 2 pgs.
Anonymous, "Common—Bug #20:Statement overflow—Chamilo9 Tracking System", Oct. 8, 2011, XP055115306, retrieved on Apr. 25, 2014, retrieved from the Internet:URL:http://wayback.archive.org/web/20111008024414/http://support.chamilo.org/issues/20, 2 pgs.
Communication: Extended European Search Report, dated May 9, 2014, for European Application No. 13001986.2-1952/2653985, 9 pgs.

\* cited by examiner

*Primary Examiner* — Etienne Leroux
(74) *Attorney, Agent, or Firm* — Buckley, Maschoff & Talwalkar LLC

(57) ABSTRACT

A system includes reception of a first query from a client device at a first database node of a database instance comprising two or more database nodes, determination of a second database node of the two or more database nodes associated with the first query, compilation of the first query at the first database node to generate first compiled code, and transmission of the first compiled code and a first identifier of the second database node from the first database node to the client device.

5 Claims, 9 Drawing Sheets

CLIENT-SIDE STATEMENT ROUTING IN DISTRIBUTED DATABASE

BACKGROUND

A distributed database system includes two or more database nodes. Each node executes one or more database processes and is associated with respective data storage. To retrieve data from a distributed database, a client application transmits a query to a database node which is designated to receive such queries. The designated database node determines whether it should execute the query or route the query to another database node for execution, and then executes or routes the query based on the determination.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
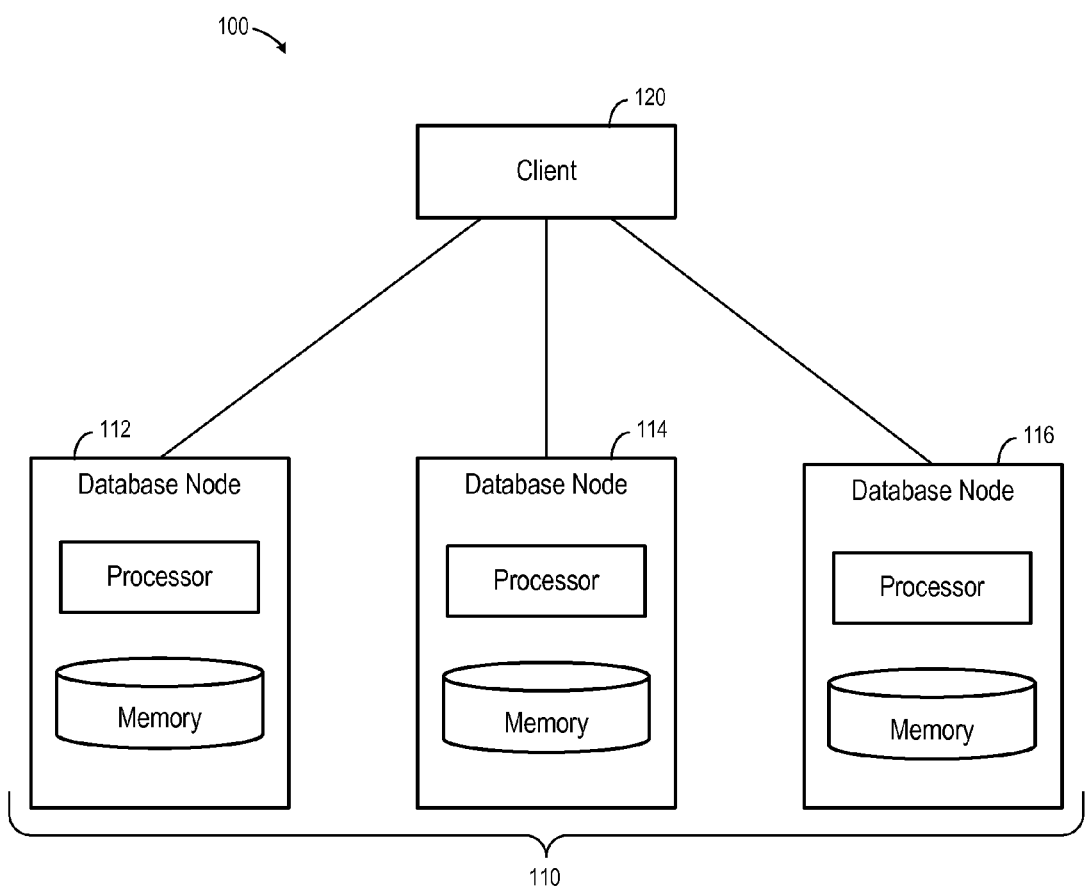
FIG. 1 is a block diagram of a system according to some embodiments.

FIG. 1 is a block diagram of system 100. System 100 represents a logical architecture for describing some embodiments, and actual implementations may include more, fewer and/or different components arranged in any manner. The elements of system 100 may represent software elements, hardware elements, or any combination thereof. For example, system 100 may be implemented using any number of computing devices, and one or more processors within system 100 may execute program code to cause corresponding computing devices to perform processes described herein.

Generally, each logical element described herein may be implemented by any number of devices coupled via any number of public and/or private networks. Two or more of such devices may be located remote from one another and may communicate with one another via any known manner of network(s) and/or via a dedicated connection.

System 100 includes database instance 110, which is a distributed database including database nodes 112, 114 and 116. Each of database nodes 112, 114 and 116 includes at least one processor and a memory device. The memory devices of database nodes 112, 114 and 116 need not be physically segregated as illustrated in FIG. 1, rather, FIG. 1 is intended to illustrate that each of database nodes 112, 114 and 116 is responsible for managing a dedicated portion of physical memory, regardless of where that physical memory is located. The data stored within the memories of database nodes 112, 114 and 116, taken together, represent the full database of database instance 110.

In some embodiments, the memory of database nodes 112, 114 and 116 is implemented in Random Access Memory (e.g., cache memory for storing recently-used data) and one or more fixed disks (e.g., persistent memory for storing their respective portions of the full database). Alternatively, one or more of nodes 112, 114 and 116 may implement an "in-memory" database, in which volatile (e.g., non-disk-based) memory (e.g., Random Access Memory) is used both for cache memory and for storing its entire respective portion of the full database. In some embodiments, the data of the full database may comprise one or more of conventional tabular data, row-based data, column-based data, and object-based data. Database instance 100 may also or alternatively support multi-tenancy by providing multiple logical database systems which are programmatically isolated from one another.

According to some embodiments, database nodes 112, 114 and 116 each execute a database server process to provide the data of the full database to database applications. More specifically, database instance 110 may communicate with one or more database applications executed by client 120 over one or more interfaces (e.g., a Structured Query Language (SQL)-based interface) in order to provide data thereto. Client 120 may comprise one or more processors and memory storing program code which is executable by the one or more processors to cause client 120 to perform the actions attributed thereto herein.

Client 120 may thereby comprise an application server executing database applications to provide, for example, business reporting, inventory control, online shopping, and/or any other suitable functions. The database applications may, in turn, support presentation applications executed by end-user devices (e.g., desktop computers, laptop computers, tablet computers, smartphones, etc.). Such a presentation application may simply comprise a Web browser to access and display reports generated by a database application.

The data of database instance 110 may be received from disparate hardware and software systems, some of which are not interoperational with one another. The systems may comprise a back-end data environment employed in a business or industrial context. The data may be pushed to database instance 110 and/or provided in response to queries received therefrom.

Database instance 110 and each element thereof may also include other unshown elements that may be used during operation thereof, such as any suitable program code, scripts, or other functional data that is executable to interface with other elements, other applications, other data files, operating system files, and device drivers. These elements are known to those in the art, and are therefore not described in detail herein.

Figure 2:
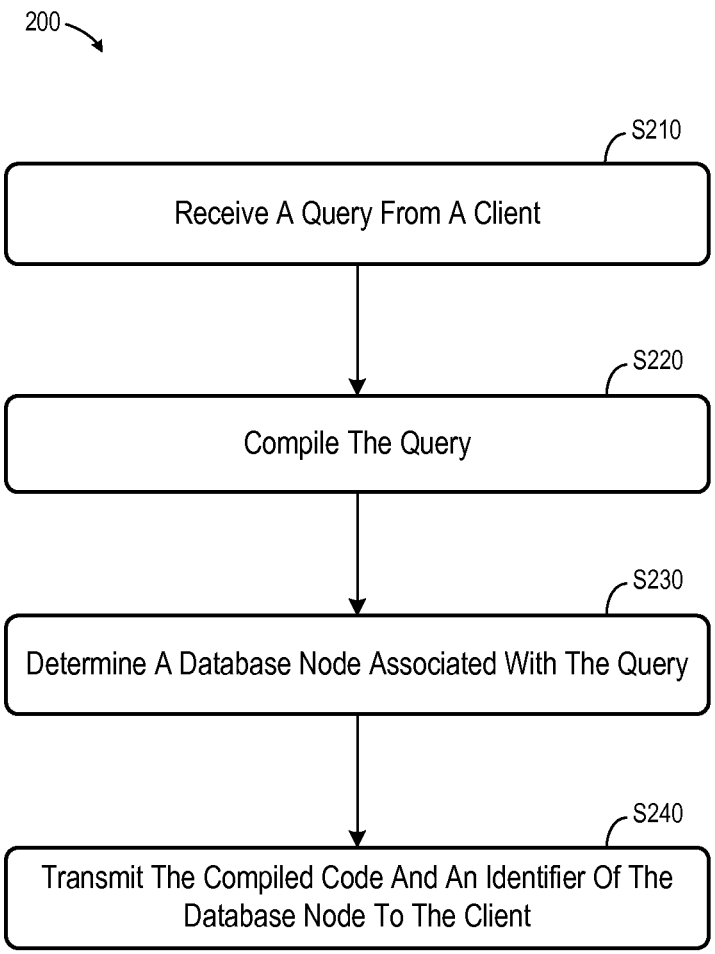
FIG. 2 is a flow diagram of a process according to some embodiments.

FIG. 2 comprises a flow diagram of process 200 according to some embodiments. Process 200 may be executed by any database node of a distributed database instance according to some embodiments. Process 200 and all other processes mentioned herein may be embodied in computer-executable program code read from one or more non-transitory computer-readable media, such as a floppy disk, a CD-ROM, a DVD-ROM, a Flash drive, a fixed disk and a magnetic tape, and then stored in a compressed, uncompiled and/or encrypted format. In some embodiments, hard-wired circuitry may be used in place of, or in combination with, program code for implementation of processes according to some embodiments.

Embodiments are therefore not limited to any specific combination of hardware and software.

Initially, at S210, a query is received from a client. For example, database node 112 of instance 110 may receive a database query from client 120 at S210. The query may conform to any suitable compliable query language that is or becomes known, such as, for example, SQL.

Next, the receiving database node compiles the query at S220. According to some embodiments of S220, the database node executes a compiler associated with the language of the query, and compilation of the query results in compiled code. The compiled code is executable by any database node to execute the query on the data managed by the database node.

In this regard, a database node associated with the query is determined at S230. The determined database node may be a database node that is determined to be suited to execute the query. For example, if the query queries Table T of the database instance, the determined database node may be a database node that manages and/or stores Table T.

The compiled query is transmitted to the client at S240. Also transmitted to the client at S240 is an identifier of the determined database node. As will be described below with respect to process 300, the identifier may allow the client to route subsequent executions of the query to an appropriate database node (i.e., to the database node identified by the identifier).

Figure 3:
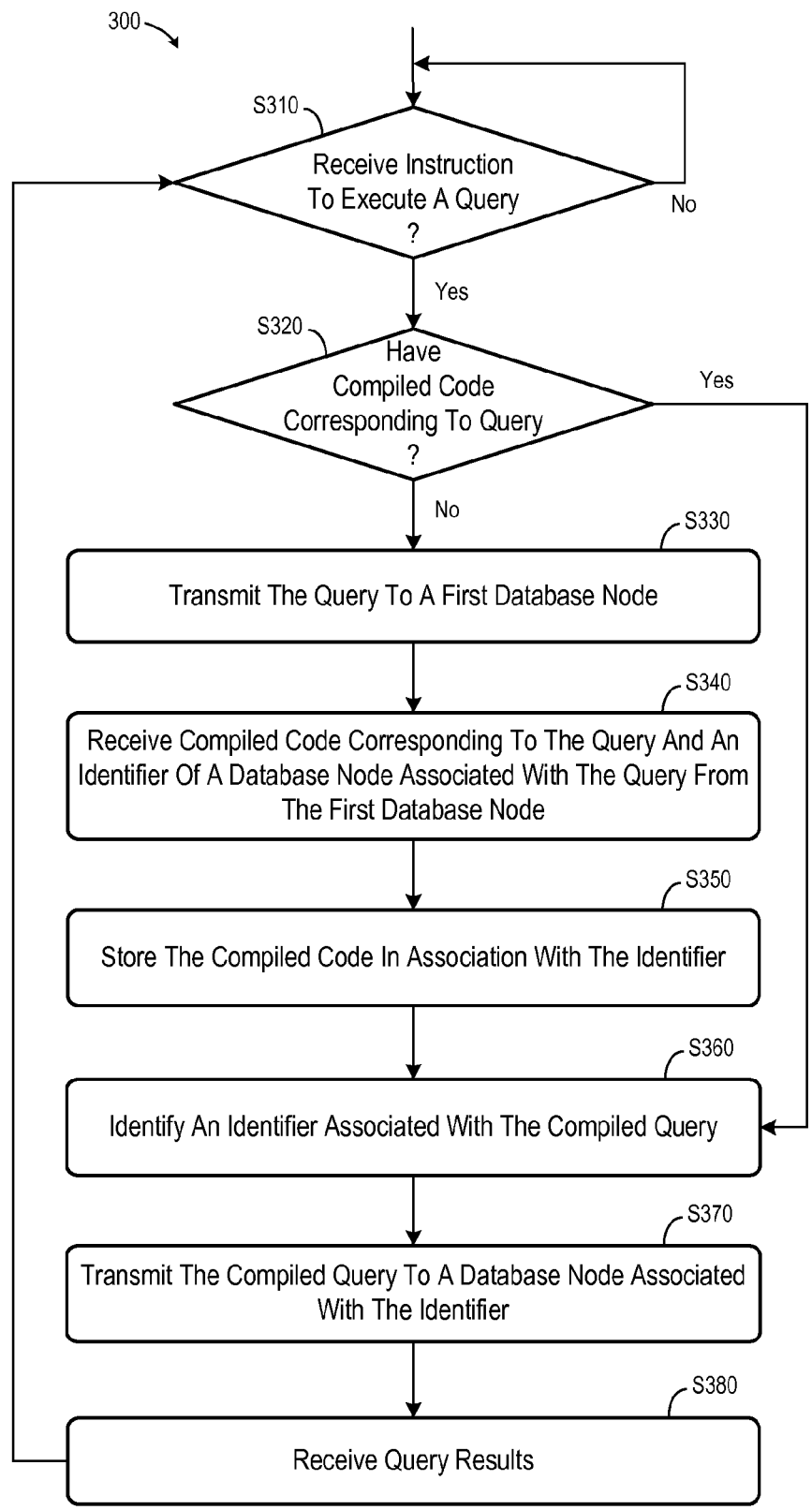
FIG. 3 is a flow diagram of a process according to some embodiments.

FIG. 3 comprises a flow diagram of process 300 according to some embodiments. Process 300 may be executed by a client device of a distributed database instance, such as but not limited to an application server, according to some embodiments.

Flow initially cycles at S310 until an instruction to execute a query is received. The instruction may be generated by internal processes of an application executing on an application server and/or received from a user device at S310.

Once a query is received, it is determined at S320 whether the client possesses compiled code corresponding to the query, as discussed above with respect to process 200. In one example of S320, a client checks a locally-stored library (e.g., an SQLDBC client library) to determine whether the compiled code resides in the library.

Figure 4:
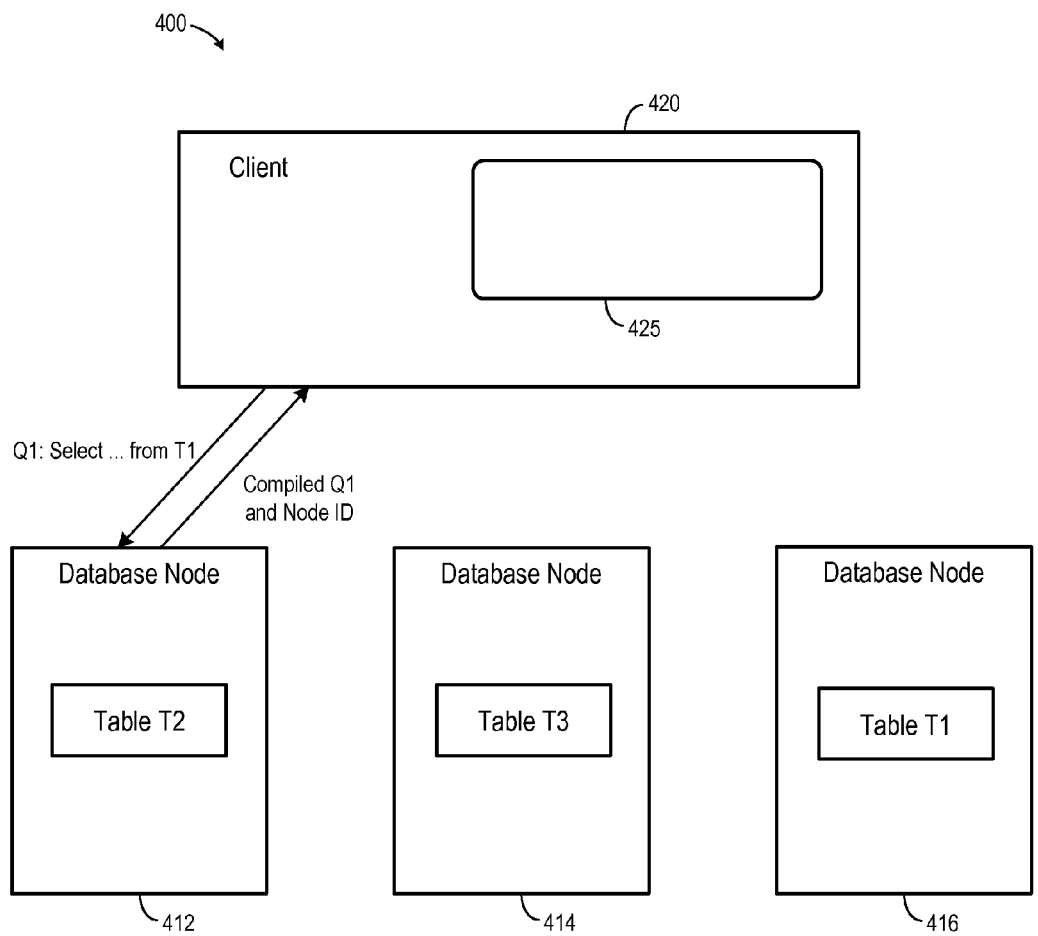
FIG. 4 is a block diagram illustrating operation of a system according to some embodiments.

FIG. 4 illustrates system 400 according to some embodiments. For purposes of the present example, it is assumed that client 420 executes process 300, and that library 425 of client 420 contains no compiled query code. Accordingly, the query to be executed is transmitted to a first database node at S330.

In the FIG. 4 example, the query "Select . . . from T1" is transmitted to database node 412 at S330. Client 420 may transmit the query by calling a "Prepare Query" API exposed by database node 412. According to some embodiments, one or both of database nodes 414 and 416 also expose the Prepare Query API and therefore the query could alternatively be transmitted to either of these nodes at S330.

As described with respect to S210 through S240 of process 200, database node 412 may proceed to compile the query, determine a database node associated with the query (i.e., "N3"—referring to node 416 in which associated Table T1 is stored), and transmit the compiled code and an identifier of the database node to the client. Returning to process 300, compiled code corresponding to the query and an identifier of a database node are received at S340. FIG. 4 illustrates transmission of the query to database node 412 at S330 and reception of the compiled code and identifier at S340.

Figure 5:
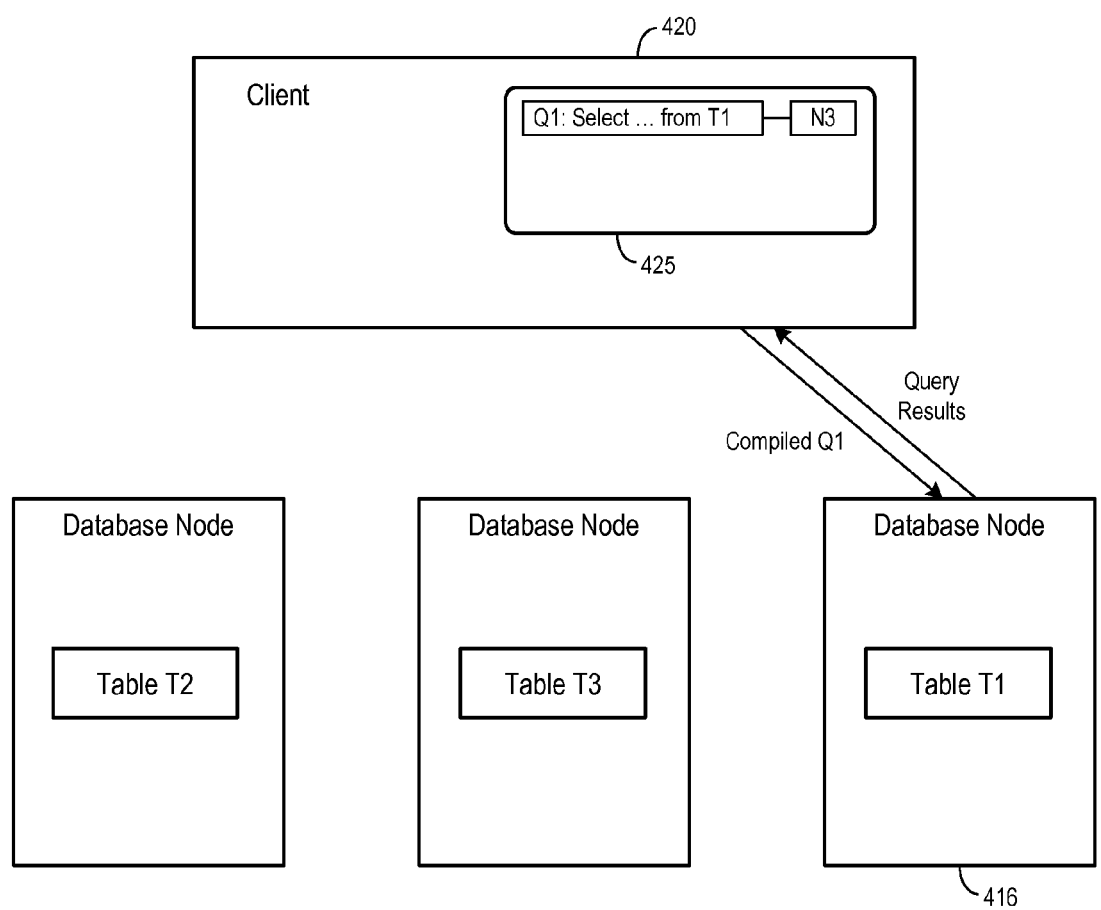
FIG. 5 is a block diagram illustrating operation of a system according to some embodiments.

The compiled code is stored in association with the identifier at S350. FIG. 5 illustrates storage of the compiled code 427 in association with the identifier (i.e., "N3") in library 425 according to some embodiments. In this regard, "in association" indicates that the identifier may be located in memory by reference to the query Q1 and/or to the corresponding compiled code.

Next, at S360, an identifier associated with the compiled query is identified. The identifier N3 is identified in the present example, and the compiled query is transmitted to a database node associated with the identifier at S370, as shown in FIG. 5. According to some embodiments, client 420 transmits the compiled query to the identified database node by calling an "Execute Query" API exposed by database node 416 and passing the compiled code as a parameter thereof.

Database node 416, in response, executes the compiled code to perform the query and returns the query results to client 420. Client 420 receives the query results at S380 and flow returns to S310 to await another instruction.

Figure 6:
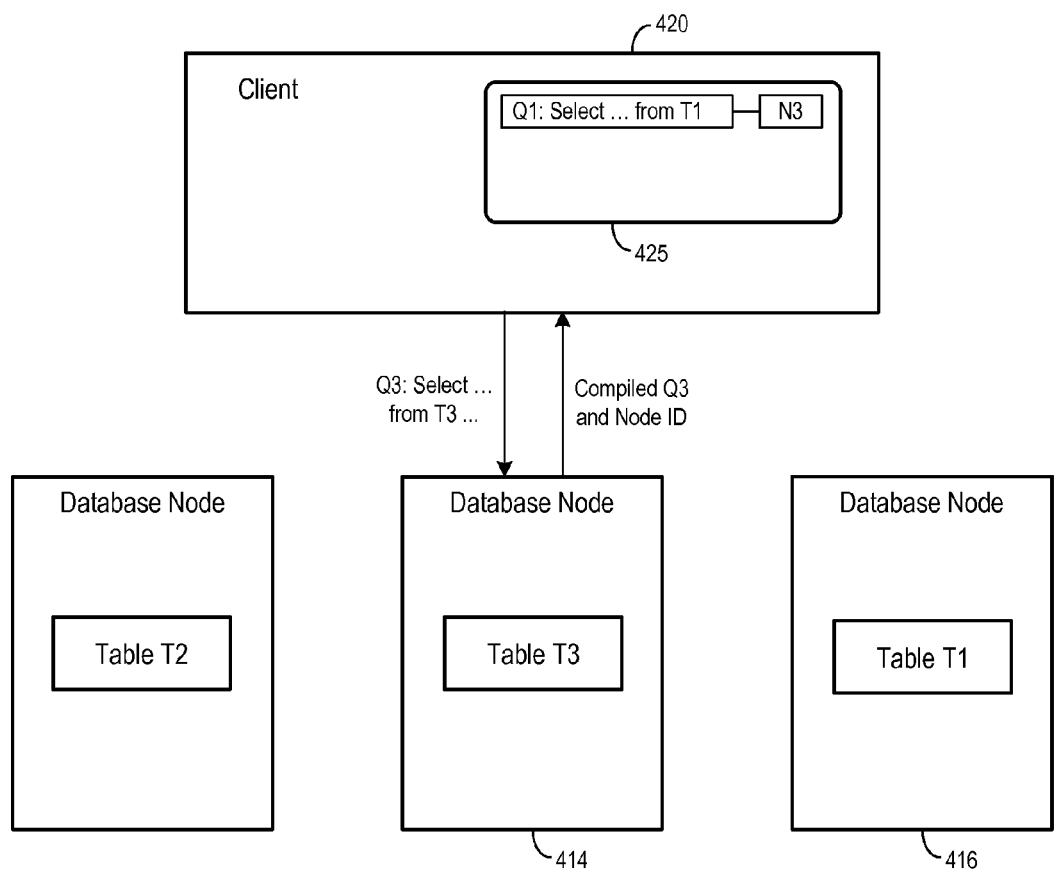
FIG. 6 is a block diagram illustrating operation of a system according to some embodiments.

FIG. 6 illustrates a scenario in which an instruction to execute another query (e.g., Select . . . from T3 . . . ) is received at S310. Continuing with the present example, library 425 does not include compiled code corresponding to the query so the query is transmitted to a database node at S330.

The query is transmitted to database node 414 in order to illustrate that process 200 may be independently executable by more than one node of a database instance. More specifically, database node 414 then compiles the query, determines a database node associated with the query (i.e., "N2"—referring to node 414 in which associated Table T3 is stored), and transmits the compiled code and an identifier of the database node to the client. Accordingly, the identifier may identify the same database node used to compile the query.

Figure 7:
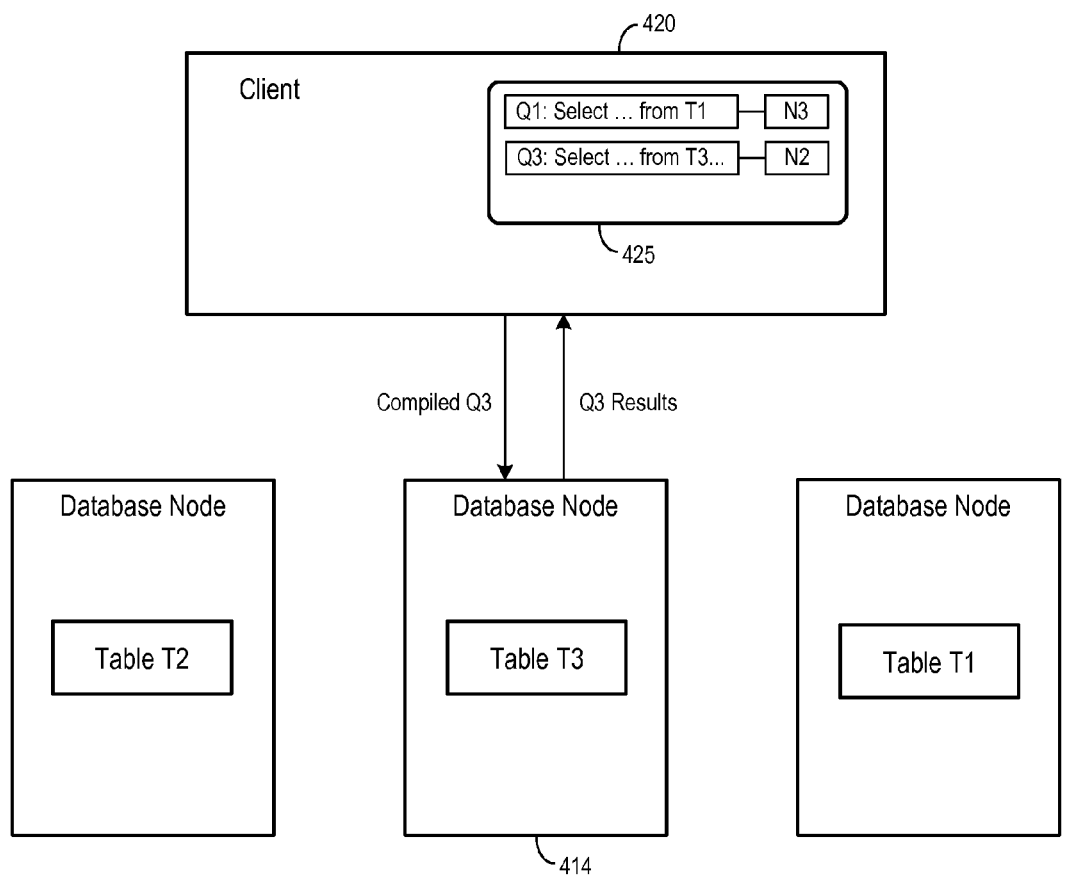
FIG. 7 is a block diagram illustrating operation of a system according to some embodiments.

The compiled code is stored in association with the identifier at S350, as shown in FIG. 7. Next, at S360, an identifier associated with the compiled query is identified, and the compiled query is transmitted to a database node associated with the identifier at S370. In the FIG. 7 case, the identified node is the same node from which the compiled code and the identifier were received. The query results are received at S380 and flow returns to S310 to await another instruction.

Figure 8:
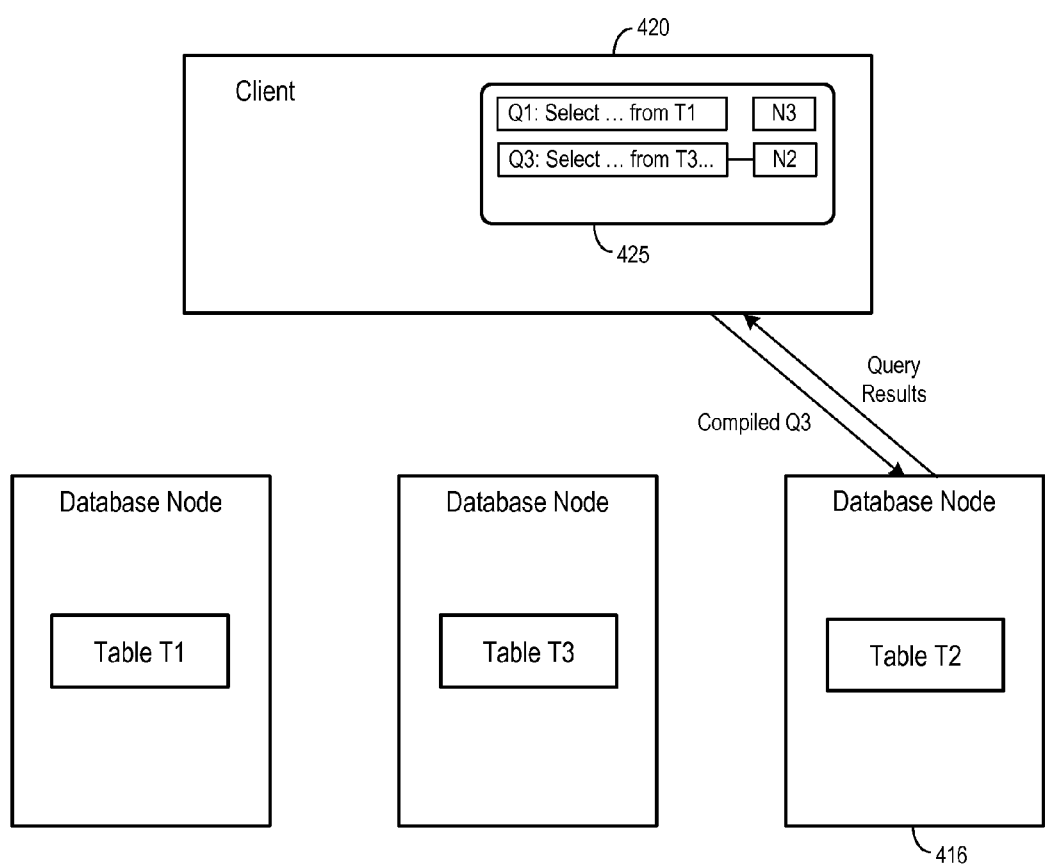
FIG. 8 is a block diagram illustrating operation of a system according to some embodiments.

It will now be assumed that an instruction to execute query Q1 is received at S310. Referring to FIG. 8, the determination at S320 is affirmative because library 425 includes compiled code corresponding to query Q1. Accordingly, flow proceeds directly to S360 to identify an identifier associated with the compiled code, and on to S370 to transmit the compiled query to a database node associated with the identifier, as illustrated in FIG. 8. New query results are then received from the database node at S380.

Therefore, according to some embodiments, second and subsequent executions of a query may avoid S330, S340 and S350 of process 300, since the client will already possess both the compiled query and an identifier of a database node which is suitable for executing the query.

Figure 9:
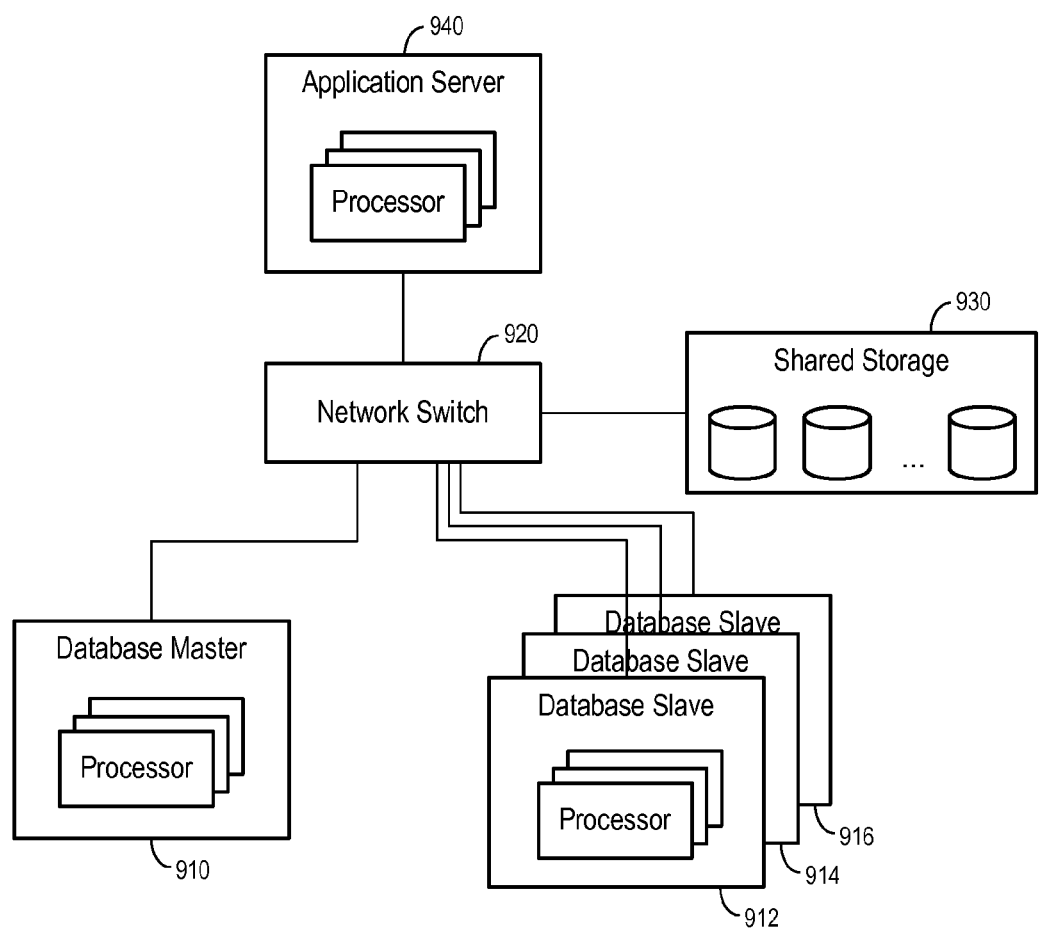
FIG. 9 is a block diagram of a hardware system according to some embodiments.

FIG. 9 is a block diagram of system 900 according to some embodiments. System 900 illustrates one hardware architecture implementing system 100 and/or 400 as described above, but implementations of either system 100 or 400 are not limited thereto. Elements of system 900 may therefore operate to execute process 200 and/or 300 as described above.

Database master 910 and each of database slaves 912, 914 and 916 may comprise a multi-processor "blade" server. Each of database master 910 and database slaves 912, 914 and 916 may operate as described herein with respect to database nodes, and database master 910 may perform additional transaction management functions and other master server functions which are not performed by database slaves 912, 914 and 916 as is known in the art.

Database master 910 and database slaves 912, 914 and 916 are connected via network switch 920, and are thereby also connected to shared storage 930. Shared storage 930 and all other memory mentioned herein may comprise any appropriate non-transitory storage device, including combinations of magnetic storage devices (e.g., magnetic tape, hard disk drives and flash memory), optical storage devices, Read Only Memory (ROM) devices, etc.

Shared storage 930 may comprise the persistent storage of a database instance distributed among database master 910 and database slaves 912, 914 and 916. As such, various portions of the data within shared storage 930 may be allotted (i.e., managed by) one of database master 910 and database slaves 912, 914 and 916.

Application server 940 may also comprise a multi-processor blade server. Application server 940, as described above, may execute database applications to provide functionality to end users operating user devices. Application server 940 may also execute process 300 to store compiled query code and associated node identifiers in local memory (not shown) for use in routing and executing database queries.

Embodiments described herein are solely for the purpose of illustration. Those in the art will recognize other embodiments may be practiced with modifications and alterations to that described above.

What is claimed is:

1. A method implemented by a computing system in response to execution of program code by a processor of the computing system, the method comprising:
   receiving a first query from a client device at a first database node of a database instance comprising two or more database nodes;
   determining a second database node of the two or more database nodes associated with the first query;
   compiling the first query at the first database node to generate first compiled code; and
   transmitting the first compiled code and a first identifier of the second database node from the first database node to the client device;
   receiving a second query from the client device at the first database node;
   determining a third database node of the two or more database nodes associated with the second query;
   compiling the second query to generate second compiled code;
   transmitting the second compiled code and a second identifier of the third database node to the client device;
   storing the first compiled code in association with the first identifier in the client device;
   storing the second compiled code in association with the second identifier in the client device;
   determining, at the client device, to execute the first query;
   identifying, at the client device, the first compiled code and the first identifier based on the first query;
   transmitting the first compiled code from the client device to the second database node based on the first identifier;
   receiving the first compiled code at the second database node;
   generating query results using the first compiled code at the second database node;
   transmitting the query results to the client device;
   determining, at the client device, to execute the second query;
   identifying, at the client device, the second compiled code and the second identifier based on the second query;
   transmitting the second compiled code from the client device to the third database node based on the second identifier;
   receiving the second compiled code at the third database node;
   generating second query results using the second compiled code at the third database node; and
   transmitting the second query results to the client device.

2. A method according to claim 1, wherein determining the second database node comprises determining that the second database node is associated with a database table specified in the first query.

3. A non-transitory medium storing computer-executable program code, the program code executable by a computing device to:
   receive a first query from a client device at a first database node of a database instance comprising two or more database nodes;
   determine a second database node of the two or more database nodes associated with the first query;
   compile the first query at the first database node to generate first compiled code;
   transmit the first compiled code and a first identifier of the second database node from the first database node to the client device receive a second query from the client device at the first database node;
   determine a third database node of the two or more database nodes associated with the second query;
   compile the second query to generate second compiled code;
   transmit the second compiled code and a second identifier of the third database node to the client device;
   store the first compiled code in association with the first identifier in the client device;
   store the second compiled code in association with the second identifier in the client device;
   determine, at the client device, to execute the first query;
   identify, at the client device, the first compiled code and the first identifier based on the first query;
   transmit the first compiled code from the client device to the second database node based on the first identifier;
   receive the first compiled code at the second database node;
   generate query results using the first compiled code at the second database node;
   transmit the query results to the client device;
   determine, at the client device, to execute the second query;
   identify, at the client device, the second compiled code and the second identifier based on the second query;
   transmit the second compiled code from the client device to the third database node based on the second identifier;
   receive the second compiled code at the third database node;
   generate second query results using the second compiled code at the third database node; and
   transmit the second query results to the client device.

4. A medium according to claim 3, wherein the program code executable by the computing device to determine the second database node comprises program code executable by a computing device to determine that the second database node is associated with a database table specified in the first query.

5. A system comprising:
   a client device comprising a processor and a memory;
   a first database node comprising a first processor and a first memory;
   a second database node comprising a second processor and a second memory, the second database node to:
     receive a first query from the client device,
     determine the first database node as being associated with the first query;

compile the first query to generate first compiled code;
transmit the first compiled code and a first identifier of the first database node to the client device;
the second database node further to:
  receive a second query from the client device;
  determine that the second database node is associated with the second query;
  compile the second query to generate second compiled code; and
  transmit the second compiled code and a second identifier of the second database node to the client device;
the client device to:
  store the first compiled code in association with the first identifier in the memory;
  store the second compiled code in association with the second identifier in the memory;
  determine to execute the first query;
  identify the first compiled code and the first identifier in the memory based on the first query;
  transmit the first compiled code to the first database node based on the first identifier;
  determine to execute the second query;
  identify the second compiled code and the second identifier in the memory based on the second query; and
  transmit the second compiled code to the second database node based on the first identifier;
the first database node to:
  receive the first compiled code;
  generate query results using the first compiled code;
  transmit the query results to the client device;
  determine, at the client device, to execute the second query;
  identify, at the client device, the second compiled code and the second identifier based on the second query; and
  transmit the second compiled code from the client device to the third database node based on the second identifier; and
the second database node further to:
  receive the second compiled code;
  generate second query results using the second compiled; and
  transmit the second query results to the client device.

* * * * *